US006901888B2

United States Patent
Baasch et al.

(10) Patent No.: US 6,901,888 B2
(45) Date of Patent: Jun. 7, 2005

(54) FUEL INJECTOR NOZZLE ADAPTER

(75) Inventors: Oswald Baasch, Bowling Green, KY (US); Laura Beth Rucker, Bowling Green, KY (US); Douglas Joseph Flynn, Bowling Green, KY (US); Shane Wilson, Bee Spring, KY (US)

(73) Assignee: Holley Performance Products, Bowling Green, KY (US)

( * ) Notice: Subject to any disclaimer, the term of this patent is extended or adjusted under 35 U.S.C. 154(b) by 0 days.

(21) Appl. No.: 10/628,103

(22) Filed: Jul. 28, 2003

(65) Prior Publication Data

US 2004/0025832 A1 Feb. 12, 2004

Related U.S. Application Data

(62) Division of application No. 09/964,779, filed on Sep. 28, 2001.

(51) Int. Cl.[7] ............................................... F02M 43/04
(52) U.S. Cl. ...................... 123/1 A; 123/575; 123/585; 123/531; 239/407; 239/418; 239/427
(58) Field of Search .............................. 239/401–406, 239/421–424, 427, 417.5, 407, 418; 123/531, 585, 1 A, 575; 60/748

(56) References Cited

U.S. PATENT DOCUMENTS

| | | | |
|---|---|---|---|
| 1,382,285 A | * | 6/1921 | Harris |
| 2,574,865 A | | 11/1951 | Edwards |
| 3,680,794 A | | 8/1972 | Romann et al. |
| 3,684,186 A | | 8/1972 | Helmrich |
| RE30,417 E | * | 10/1980 | Rand, Jr. |
| 4,448,160 A | * | 5/1984 | Vosper |
| 4,566,634 A | | 1/1986 | Wiegand |
| 4,600,151 A | | 7/1986 | Bradley |
| 4,683,843 A | | 8/1987 | Norcia et al. |
| 4,691,672 A | | 9/1987 | Jones |
| 4,798,190 A | | 1/1989 | Vaznaian et al. |
| 4,842,197 A | | 6/1989 | Simon et al. |

(Continued)

FOREIGN PATENT DOCUMENTS

AU          2078492          1/1992

OTHER PUBLICATIONS

Nitrous Express Next Generation Nitrous System 2003 Catalog (no author, undated); pp. 1 and 8.
SEMA News, vol. 34, No. 10, Oct. 2002; p. 80.
Internet Web Page www.nitrousexpress.com/main.html, printed on Jan. 5, 2003 (no author, dated 2002).
Internet Web Page www.nitrousexpress.com/whats_new.html, printed on Jan. 5, 2003 (no author, dated 2002).
International Search Report.
Excerpts of File History of U.S. Appl. Ser. No. 10/751,638 –Office Action Dated Sep. 17, 2004 and claims considered therein.

*Primary Examiner*—Hai Huynh
(74) *Attorney, Agent, or Firm*—Hunton & Williams LLP

(57) ABSTRACT

A fuel injector adapter for providing nitrous oxide to an internal combustion engine is disclosed. The nozzle has a central fuel injector passage that terminates at a first outlet end. Fuel from a fuel injector may be passed through the central fuel injector passage. The nozzle also has an inner annular passage arranged circumferentially around the central fuel injector passage. The inner annular passage terminates at a second outlet end. The nozzle also has an outer annular passage arranged circumferentially around the inner annular passage that terminates at a third outlet end. One or both of the inner and outer annular passages is adapted to pass nitrous oxide through it. The nozzle is adapted to fit between a fuel injector and an engine without substantial modification to the engine.

20 Claims, 9 Drawing Sheets

U.S. PATENT DOCUMENTS

| | | | |
|---|---|---|---|
| 4,962,889 A | | 10/1990 | Halvorsen |
| 5,035,358 A | | 7/1991 | Katsuno et al. |
| 5,046,472 A | | 9/1991 | Linder |
| 5,129,381 A | | 7/1992 | Nakajima |
| 5,170,766 A | | 12/1992 | Haas et al. |
| 5,193,743 A | | 3/1993 | Romann et al. |
| 5,211,682 A | * | 5/1993 | Kadowaki et al. |
| 5,218,824 A | | 6/1993 | Cederwall et al. |
| 5,255,658 A | * | 10/1993 | Hoffer et al. |
| 5,269,275 A | | 12/1993 | Dahlgren |
| 5,287,281 A | | 2/1994 | Meaney |
| 5,288,021 A | | 2/1994 | Sood et al. |
| 5,444,628 A | | 8/1995 | Meaney et al. |
| 5,467,926 A | | 11/1995 | Idleman et al. |
| 5,482,023 A | | 1/1996 | Hunt et al. |
| 5,551,400 A | | 9/1996 | Rice et al. |
| 5,605,287 A | | 2/1997 | Mains |
| 5,657,733 A | | 8/1997 | Dozier et al. |
| 5,699,776 A | | 12/1997 | Wood et al. |
| 5,826,804 A | | 10/1998 | Reiter et al. |
| 5,833,141 A | | 11/1998 | Bechtel, II et al. |
| 5,887,799 A | | 3/1999 | Smith |
| 5,890,476 A | | 4/1999 | Grant |
| 6,116,225 A | | 9/2000 | Thomas et al. |
| 6,260,546 B1 | | 7/2001 | Vaughn |
| 6,269,805 B1 | | 8/2001 | Wilson |
| 6,360,714 B1 | | 3/2002 | Kotooka et al. |
| 6,378,512 B1 | | 4/2002 | Staggemeier |
| 6,453,894 B1 | | 9/2002 | Fischer et al. |
| 6,520,165 B1 | * | 2/2003 | Steele .................. 123/590 |
| 6,561,172 B1 | | 5/2003 | Chestnut et al. |
| 2002/0011064 A1 | | 1/2002 | Crocker et al. |
| 2002/0162333 A1 | | 11/2002 | Zelina |

\* cited by examiner

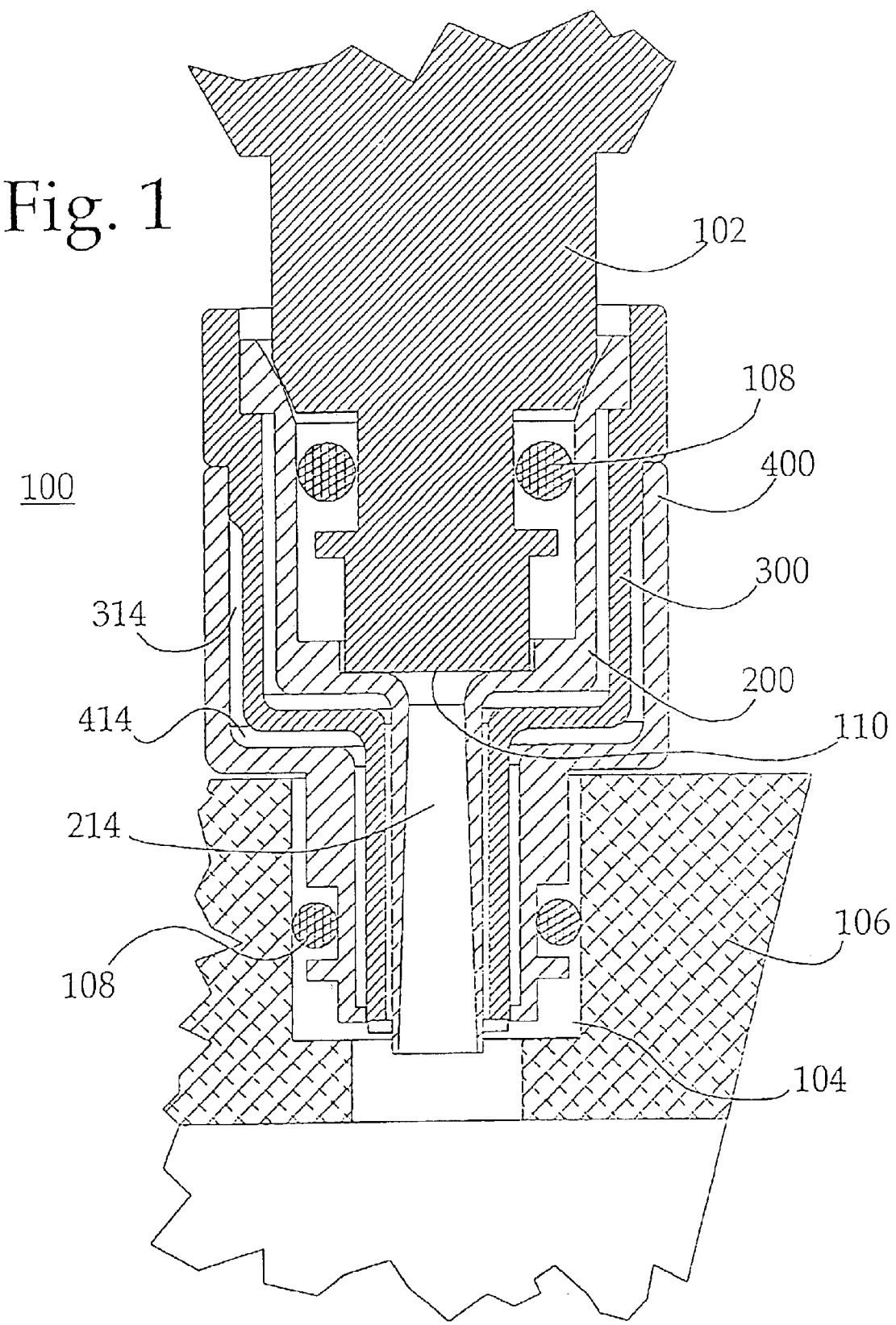

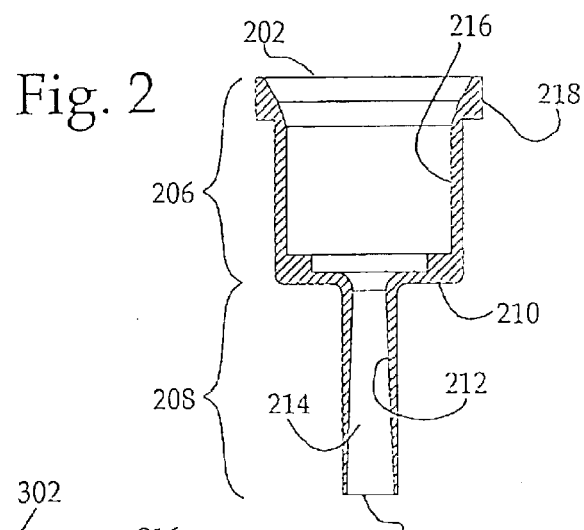
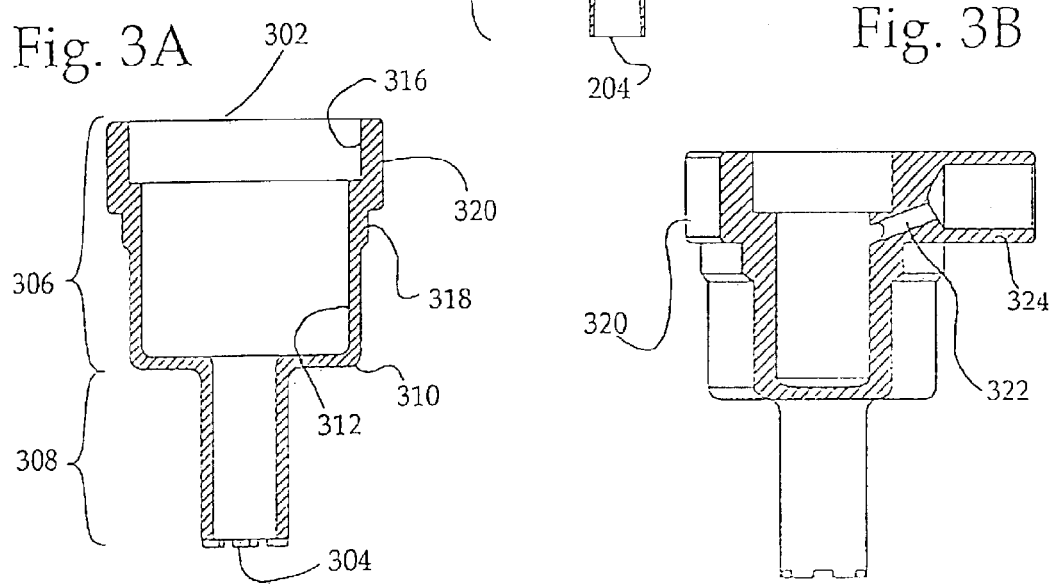
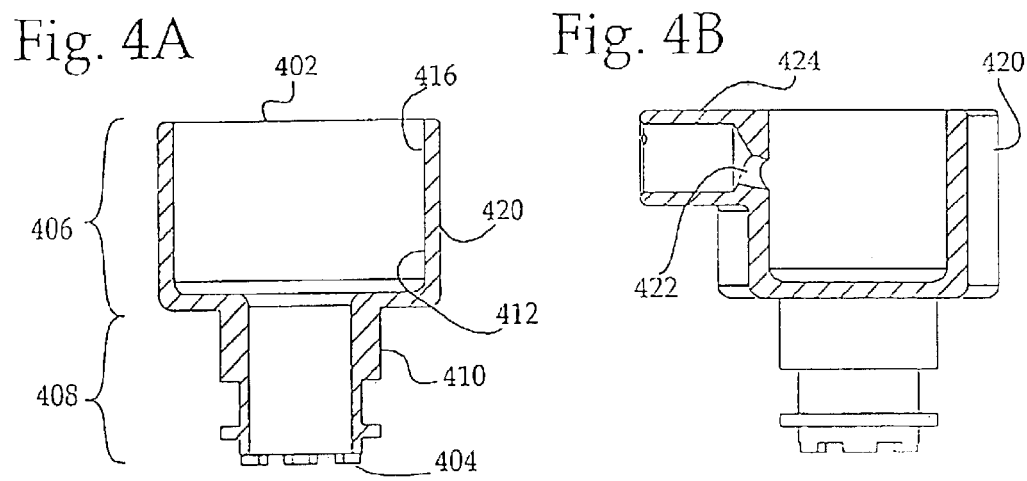

FUEL INJECTOR NOZZLE ADAPTER

This is a divisional of U.S. application Ser. No. 09/964,779 filed on Sep. 28, 2001, which is incorporated herein by reference in its entirety.

FIELD OF THE INVENTION

The present invention relates generally to internal combustion engine performance enhancers and fuel system modification. More specifically, the present invention relates to nitrous oxide systems and alternative fuel systems for use with multipoint fuel injected engines.

BACKGROUND OF THE INVENTION

Over the years, internal combustion engines have evolved into more efficient and powerful machines. As part of this evolution, the structures, dynamics, and control systems of modern engines have become highly specialized at burning either gasoline or diesel fuel. Although this evolution has made engines more efficient and has often resulted in modest power increases, the resulting engine designs have proven to be difficult to modify for specialty purposes using conventional modification techniques and devices. There is a need to provide new modification devices and methods that may be used with modern engine designs. In particular, there is a need to provide new ways to adapt engines to operate using additional combustion reactants, such as nitrous oxide, and to operate using alternative fuels, such as propane, alcohol, compressed natural gas (CNG), liquid natural gas (LNG), and the like.

Nitrous oxide injection systems are used as a performance enhancer to increase the power output of engines. Nitrous oxide injections systems generally operate by introducing a supply of nitrous oxide into the combustion chamber of an internal combustion engine, such as common two-stroke, four-stroke, diesel and Wankel rotary engines, which may be naturally aspirated or have forced air induction. Nitrous oxide contains about 36% by weight of oxygen whereas air contains only about 21% by weight of oxygen. The additional oxygen provided by the nitrous oxide when combined with an additional amount of fuel increases the power output of the engine relative to a similar engine using only air and fuel as the combustion reactants. Historically, such systems have been used in various applications. Currently, nitrous oxide systems are used in drag racing cars, trucks, motorcycles, snowmobiles, personal watercraft and street vehicles.

Modern nitrous oxide systems may be used with carbureted and fuel injected engines. There are two types of nitrous oxide injection system: "wet" systems and "dry" systems. Wet nitrous oxide injection systems meter (supply) both nitrous oxide and fuel to the engine, whereas dry nitrous oxide injection systems meter only nitrous oxide to the engine. Dry systems are used mainly in fuel injected engines, and the fuel for a dry system is typically provided by the engine's original fuel injectors or replacement injectors that may provide a different fuel flow rate than the original injectors.

Until recently, nitrous oxide injection systems were typically installed to provide nitrous oxide at a central location corresponding to the carburetor or throttle body of the engine. Carbureted engines and single-point fuel injected (SPFI) engines typically have a single fuel supply or set of fuel supplies located in a central location along the engine air inlet path. The inlet air in such engines typically passes through a filter, then through a carburetor (or throttle body, in the case of SPFI engines) where fuel is introduced into the airflow to create a fuel/air mixture. The intake plenums and runners on carbureted and SPFI engines are typically designed to convey air and fluid to the cylinders. Typically, each runner carries the fuel and air mixture to a respective cylinder of the engine. The runners are shaped and connected to the plenum to assure the delivery of an equal and homogeneous air fuel mixture to each cylinder. The fuel/air mixture is divided by the intake plenum (also known as an intake manifold) into several different airflows that feed the various engine cylinders. The intake plenum is designed to evenly distribute the fuel and air mixture to each cylinder. In such systems, the nitrous oxide may be supplied centrally much like the fuel, because the intake plenum will evenly distribute it to the cylinders along with the conventional fuel/air mixture. High HP engine applications use fogger nozzles to assure even fuel and nitrous oxide distribution to each of the cylinders. These fogger nozzles carry and mix the nitrous oxide and fuel stream into the induced air stream of the cylinder during the engine induction process.

In recent years, however, engine emissions standards have become stricter, and engine manufacturers have responded by producing multipoint fuel injection systems for almost all modern vehicles. Multipoint fuel injection systems use individual fuel injector nozzles located near each cylinder of the engine. Air is provided to each cylinder by a highly tuned intake plenum. Although multipoint fuel injection systems increase the combustion efficiency of the engine, and provide the potential for increased power, they have increased the difficulty of installing a nitrous oxide system to the engine. The problem stems largely from the "dry" intake plenums used with multipoint fuel injected engines. Dry intake plenums are designed to convey air, and not liquids, from the engine air inlet to the cylinders. As such, when nitrous oxide and fuel is supplied at a central location along the air inlet as it is with carbureted engines and single-point fuel injected engines, the fuel may not be evenly distributed to the cylinders by the dry intake plenums. Such condition causes some cylinders to run excessively rich and others excessively lean resulting in backfires in the intake manifold and/or engine failure. Other problems may also exist when using a single source of nitrous oxide with a modern multipoint fuel injected engine.

In order to accommodate the proliferation of multipoint fuel injected engines, nitrous oxide system manufacturers have provided systems that introduce nitrous oxide in the proximity of the cylinders. Prior art nitrous injectors use a nitrous oxide spray nozzle located near each cylinder's fuel injector. This solution, however, has several limitations. Two of the more problematic factors are the intake plenum thickness and intake plenum material. Current nitrous oxide systems for multipoint fuel injected engines are attached to the intake plenum by drilling and tapping threads into a hole in the engine's intake plenum (which are typically aluminum, but may be other materials, such a plastic or a combination of materials) and threading the nozzle into the plenum. Even under the best of circumstances, that is, when the intake plenum is aluminum and thick enough to engage a threaded fastener, the installation process is labor intensive and requires removal of the intake plenum to avoid contaminating the engine with debris created during the installation. This solution may not be used if the intake plenum is either too thin or made from a material that does not lend itself to accepting threaded fasteners, such as plastic. If the plenum is too thin or made of a weaker material such as plastic, then a boss must be welded, ultrasonically bonded or glued to the plenum at each spray nozzle location to allow the installation, and the intake plenum still must be removed to prevent contamination of the engine. The increased use of plastic and combined plastic and aluminum intake plenums has made these additional steps more often necessary. In addition, plastic plenums are more susceptible to damage during a backfire when they have been drilled and reinforced with a boss.

Other problems may also be present when attempting to use a conventional nitrous oxide system with a modern multipoint fuel injected engine. For example, the nitrous oxide spray nozzle must almost certainly be placed in a location that is not ideal for injecting fuel into the combustion chamber due to the fact that the original fuel injector is likely already in such a location. In addition, it may be difficult or impossible to locate the spray nozzle in a position that is ideal for combining the nitrous oxide with the fuel and air or for directing the nitrous oxide towards the cylinder intake because of space limitations within the engine compartment and because the intake plenum may be covered or otherwise obstructed by other engine components at the place where it is desired to locate the spray nozzle. These spray nozzles also have the tendency to project into the runner of the intake manifold restricting the air flow and thus reducing the volumetric efficiency of the engine. This is especially true for relatively small engines, such as those in motorcycles, snowmobiles and personal watercraft.

In addition to the above noted problems with modifying modern engines to use nitrous oxide, modem engine designs pose similar problems to those wishing to modify them to operate using alternative fuels. Alternative fuel vehicles use fuels other than those derived from petroleum products, such as: propane, alcohol, blends of alcohol and other fuels, compressed natural gas, liquid natural gas, and the like.

It would be desirable to provide an apparatus that can provide other fuels and reactants to the engine. For example, it may be desired to supply air to increase injector spray atomization, re-circulated exhaust gases to reduce exhaust emissions, or propane or compressed natural gas to enhance engine combustion efficiency and/or cold starting. It may also be desirable to provide alcohol, nitromethane, and diesel fuels to the engine.

These and other disadvantages of the prior art are overcome by the invention of the preferred embodiments.

SUMMARY OF THE INVENTION

The objectives of the present invention may be accomplished by providing a nozzle for supplying nitrous oxide and fuel, or just nitrous oxide to an internal combustion engine. The nozzle has a central fuel injector passage that terminates at a first outlet end. Fuel from a fuel injector may be passed through the central fuel injector passage. The nozzle also has an inner annular passage arranged circumferentially around the central fuel injector passage. The inner annular passage terminates at a second outlet end. The nozzle also has an outer annular passage, arranged circumferentially around the inner annular passage, that terminates at a third outlet end. One or both of the inner and outer annular passages is adapted to pass nitrous oxide through it. The nozzle is adapted to fit between a fuel injector and an engine without substantial modification to the engine.

In various embodiments, the central fuel injector passage may have a diameter of about 0.080 to about 0.150 inches and may be about 0.104 inches, and may be tapered to have a larger diameter at the first outlet end. The central fuel injector passage may be selected to allow at least about 80% of the fuel to pass through it unimpeded. In other embodiments, the width of the inner annular passage may be about 0.008 to about 0.030 inches, and may be about 0.013 to about 0.014 inches (as measured at the second outlet end). In still other embodiments, the width of the outer annular passage may be about 0.010 to about 0.045 inches, and may be about 0.020 to about 0.021 inches (as measured at the third outlet end).

In other embodiments, the second outlet may be staggered back from the first outlet end, and the third outlet end may be staggered back from the second outlet end. The stagger distance may be, in various embodiments, between about 0.010 and about 0.100 inches, and in the most preferred embodiments may be about 0.050 inches in the most preferred embodiments. The outlets may be staggered to accommodate fitting the nozzle into various types of fuel injector receptacle.

In yet other embodiments, the second outlet end, the third outlet end, or both, may also be equipped with castellations, fingers, or both. The castellations and fingers may be straight or angled. The second outlet castellations each may have a width of about 0.020 and about 0.100 inches and a depth of about 0.010 and about 0.040 inches, and in the most preferred embodiments may have a width of about 0.060 inches and a depth of about 0.024 inches. The third outlet castellations each may have a width of about 0.050 and about 0.150 inches and a depth of about 0.010 and about 0.060 inches, and in the most preferred embodiments may have a width of about 0.094 inches and a depth of about 0.030 inches. The second outlet castellations and third outlet castellations may be indexed relative to one another.

In various additional embodiments, the first annular passage and second annular passage may both be adapted to pass nitrous oxide in one configuration. In another configuration, the first annular passage may be adapted to pass additional fuel while the second annular passage is adapted to pass nitrous oxide.

The inner and outer annular passages may be fed by inner and outer passage inlets, respectively, that are oriented to provide ideal flow conditions therein. In one embodiment the inner and outer annular passage inlets may be tangential to their respective passages and angled slightly towards the second and third outlet ends.

In still other preferred embodiments, the nozzle may be adapted to fit between a fuel injector and an engine without significantly raising the fuel injector and fuel rail with respect to the fuel injector receptacle. In some embodiments, the fuel injector may be raised no more than about 1.25 inches, and in other embodiments, the fuel injector may be raised no more than about 0.75 inches.

The nozzle may be constructed from an interior cup, a middle cup and an exterior cup. The cups may, in various configurations, be made of plastic or metal, and may be ultrasonically joined or otherwise welded or joined together. An embodiment having metal cups may be at least partially fabricated from an extrusion, such as an ear lobed extrusion, that is shaped to provide machining or cost benefits.

In an embodiment having castellations, the castellations may be adapted to promote various flow patterns in the nitrous oxide and fuel, such as tumble flow and swirl flow. The nozzle may also be configured to reduce or prevent fuel choke-off. In various embodiments, the castellations may be substantially perpendicular or angled with respect to the cylindrical axis of the nozzle.

A method for providing nitrous oxide is also provided. In one preferred method, nitrous oxide, and in some cases additional fuel, is provide annularly around a central flow of fuel. The nitrous oxide and additional fuel also may be passed through castellations.

A nitrous oxide kit is also provided by the present invention. The kit has a nozzle through which nitrous oxide and fuel may be passed. The nozzle may be installed between an engine's fuel injectors and fuel injector receptacles without substantially modifying the engine.

A method of installing a nitrous oxide system into an engine is also disclosed. The method includes removing the engine's fuel injectors, installing nozzles into the fuel injector receptacles, and installing the fuel injectors into the nozzles. The nozzles are adapted to pass fuel through them, and are also adapted to pass one or two flows of nitrous oxide, as well. In another embodiment, the nozzles may be adapted to pass two separate flows of fuel and a flow of nitrous oxide through them.

In various other embodiments, the method of installing a nitrous oxide system may also include installing a distribution block near the engine and connecting each nozzle to the channel or channels of the distribution block. The distribution block may provide two flows of nitrous oxide, or one flow of nitrous oxide and one flow of additional fuel.

The present invention also provides a method of manufacturing a nitrous oxide nozzle. The manufacturing method includes the steps of inserting an interior cup into a middle cup, inserting the middle cup into an exterior cup, and joining each cup to at least one of the other cups. The interior cup has a central passage through it, an inner annular passage is formed between the interior cup and the middle cup, and an outer annular passage is formed between the middle cup and the exterior cup. In various embodiments, the cups may be joined by friction fitting, ultrasonic or other types of welding or brazing.

The present invention also provides a nozzle that may be used to provide various combustion reactants to the engine. Various embodiments of the invention may be adapted to provide propane, natural gas, alcohol, alcohol blends, gasoline, and nitrous oxide to the engine, as well as combinations thereof.

Additional objects, features and advantages of the preferred embodiments will become apparent from the drawing figures together with the detailed description of the preferred embodiments.

BRIEF DESCRIPTION OF THE DRAWINGS

FIG. 1 is a cross-sectional view of a preferred fuel injector nozzle embodiment of the invention shown installed between a fuel injector and an intake plenum;

FIG. 2 is a cross-sectional view of the interior cup of the fuel injector nozzle of FIG. 1;

FIG. 3A is a front cross-sectional view of the middle cup of the fuel injector nozzle of FIG. 1;

FIG. 3B is a side cross-sectional view of the middle cup of FIG. 3A;

FIG. 4A is a front cross-sectional view of the exterior cup of the fuel injector nozzle of FIG. 1;

FIG. 4B is a side cross-sectional view of the exterior cup of FIG. 4A;

DETAILED DESCRIPTION OF THE PREFERRED EMBODIMENTS

Figure 5:
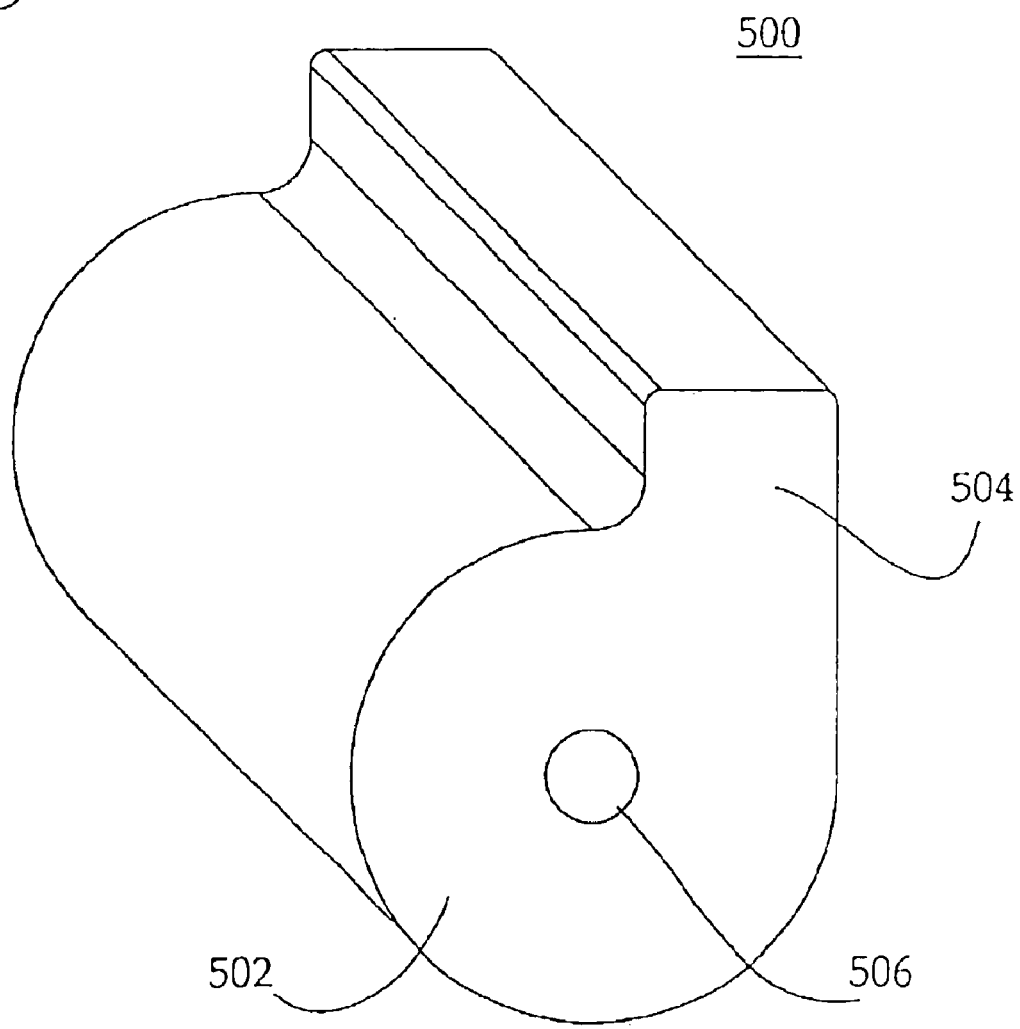
FIG. 5 is an isometric view of an extrusion from which one or more of the cups may be fabricated.

The term "engine," as used herein, refers to any type of internal combustion engine, such as two- and four-stroke reciprocating piston engines and rotary engines (e.g., Wankel-type engines) having one or more cylinders or combustion chambers. Such engines may be used to propel vehicles, such as automobiles, industrial equipment, watercraft and aircraft, and may be used in various stationary applications, such as power generation, pumping, and other industrial uses. Although the present invention is particularly suited to provide increased power in automotive applications, embodiments of the invention may be used to provide benefits in any other application when an intermittent or continuous increase in power output is desired for an internal combustion engine.

As used herein, the term "fuel injector" and "injector" refer to any type of fuel injector for supplying fuel into an internal combustion engine. For example, an injector may be of the type referred to as a "top feed" injector that may be supplied by Robert Bosch Corporation (of Farmington Hills, Mich.), Siemens Automotive (Duluth, Ga.), Delphi Automotive Systems (Troy, Mich.), Magneti Marelli SpA (Milan, Italy) or Keihin (Tokyo, Japan). The fuel injector may be supplied as original equipment on an engine or as a replacement part, such as the fuel injectors supplied by Holley Performance Products (Bowling Green, Ky.). Fuel injectors are typically operated by a control system that operates a mechanical, electrical, or electromechanical device to meter fuel according to instructions from a control circuit. The present invention may be used with any type of injector, regardless of the details of its control system.

As used herein, the term "combustion reactant" is understood to encompass any substance that may be used as part of a chemical combustion reaction (burning), including air, oxygen carriers (such as nitrous oxide), and fuels (such as gasoline, diesel fuel, natural gas, propane, alcohol, blends of these fuels, and so on).

In general terms, the present invention comprises a combustion reactant injection nozzle that is designed to be installed into modern multipoint fuel injected engines, preferably without substantial modification to the intake plenum or the engine. An embodiment of the invention comprises a fitting having a central flow passage and a pair of coaxial annular flow passages (i.e., passages circumferentially surrounding the central flow passage). The nozzle may be installed between a conventional fuel injector and a conventional intake plenum with little or no modification to the engine. The fuel spray from the fuel injector passes through the central flow passage, while nitrous oxide flows through at least one of the annular flow passages, while a second flow of nitrous oxide or additional fuel may be supplied through the other annular flow passage. In other embodiments, other fuels or combustion reactants may flow through the central flow passage and one or both of the annular flow passages.

The flow of the nitrous oxide and additional fuel (or other reactants) may be metered to operate in conjunction with the fuel injector in order to provide a temporary or a sustained increase in engine power output. This metering function may be provided by using any number of control systems. For example, the metering function may be provided by the control system originally supplied with the engine, may be provided by the original control system after reprogramming, or may be provided by an additional control system operating in conjunction with the original system or a reprogrammed original control system.

In embodiments in which only nitrous oxide is supplied in addition to the fuel supplied by the fuel injector, the system may be referred to as a "dry" system. A dry system may have multiple stages, each stage corresponding to a different input flow of nitrous oxide. The stages may be initiated sequentially, simultaneously or in any other manner that is desired to provide additional power output. In embodiments in which both nitrous oxide and additional fuel are provided through separate coaxial flow passages, the system may be referred to as a "wet" system. The flow of nitrous oxide and additional fuel in wet systems may be controlled in much the same manner as a dry system, or may use any other suitable control system.

Referring now to FIG. 1, the present invention generally comprises a nozzle 100 having three nested fuel cups. An interior cup 200 fits within a middle cup 300, and the middle cup 300 fits within an exterior cup 400. The interior cup 200 is shaped to receive a fuel injector 102, and the exterior cup 400 is shaped to fit within a standard fuel injector receptacle 104 of an engine, such as those typically located in an intake plenum 106. The fuel injector receptacle 104 is typically located in close proximity to the engine intake valves. The present invention may be used with any internal combustion engine using a multipoint fuel injection system.

The fuel injector 102 may be sealed into the interior cup 200 by one or more sealing devices 108, such as rubber o-rings, gaskets, or other substantially fuel-tight seals. Similarly, the exterior cup 400 may be sealed into the fuel injector receptacle 104 by one or more sealing devices 108. Such sealing devices are known in the art. The fuel injector 102 supplies fuel through an injector nozzle 110 located at the tip of the fuel injector 102. It should be understood that although a fuel injector is depicted in the Figures, this is done only for clarity in describing the embodiments of the invention. The present invention is not intended to be limited to the use of any particular fuel injector, and embodiments of the invention may be adapted to work with any fuel injector.

Referring now to FIG. 2, the interior cup 200 comprises a cylindrical structure having a stepped diameter that extends from a first inlet end 202 to a first outlet end 204. A first receptacle portion 206 is adjacent the first inlet end 202. The first receptacle portion 206 has a first inner mating surface 216, which may be shaped to receive a number of different types of fuel injectors 102. The first receptacle portion 206 also has a first outer mating surface 218 that extends along at least a portion of the first receptacle portion 206. The first outer mating surface 218 may be sized to fit within and/or against one or both of the middle cup 300 and the exterior cup 400.

A first outlet portion 208 preferably extends substantially coaxially along the cylindrical axis of the interior cup 200 from the first receptacle portion 206 to the first outlet end 204. The average diameter of the first outlet portion 208 is less than the average outer diameter of the first receptacle portion 206. The first outlet portion 208 has a first interior surface 212 that may be substantially cylindrical, or may be tapered. The first interior surface 212 defines a cylindrical or frustum-shaped central fuel injector passage 214 through which fuel from the fuel injector 102 passes to the intake plenum 106. The first outlet end 204 may be located to be at or near the original location of the fuel injector nozzle 110. In a preferred embodiment, the shape and size of the first interior surface 212 is adapted to minimize any obstruction to the fuel that flows from the fuel injector nozzle 110.

Fuel blockage caused by fuel from the fuel injector 102 striking the first interior surface 212 may degrade the performance of the engine. As fuel exits the fuel injector nozzle 110 in a typical conical spray pattern, it may strike a portion of the first interior surface 212, thereby interrupting the ideal fuel flow and causing power or torque losses. This degradation may be particularly apparent when the engine is operating with the present invention installed, but without being provided with the nitrous oxide and additional fuel that may be supplied by the present invention. Fuel injectors 102 having a narrower spray pattern may be less affected or unaffected by installation in the present invention.

The amount of fuel blockage caused by the first interior surface 212 may be reduced by increasing the central fuel injector passage diameter, and by tapering the central fuel injector passage 214 to be larger towards the first outlet end 204. For example, the central fuel injector passage 214 may have a diameter of between about 0.080 inches and about 0.150 inches, and may be about 0.104 inches, and may allow more than about 80% of the fuel to flow without obstruction. In the case of small engine displacement applications, the spray velocity is affected by the large tapered cross-section of the flow passage 214, and a smaller cylindrical cross-section may be desired and designed for the particular application. The first outlet end 204 may also be provided with an orifice to contain the fuel charge by means of the surface tension of the liquid. The degree to which the central fuel injector passage diameter and the taper angle may be increased may limited by the space constraints of the fuel injector receptacle 104 and intake plenum 106, the shapes and sizes of other parts of the invention, and by the strength, castability and machinability of the material from which the interior cup 200 is made. These constraints, and other ways of reducing the amount of fuel blockage caused by the first inner wall 212 and improving the fuel flow through the central fuel injector passage 214, will be apparent to those skilled in the art based on the teachings provided herein.

The first outlet portion 208 and first receptacle portion 206 also have a first exterior surface 210, which may have several portions that are substantially cylindrical, tapered, radiused, or a combination thereof. The first exterior surface 210 extends from the first outer mating surface 218 to the outlet end 204. In the embodiment of FIG. 2, the first exterior surface 210 has two cylindrical portions (one in each of the first receptacle portion 206 and the first outlet portion 208), and a disk-like portion joining the cylindrical portions.

Referring now to FIG. 3A, a preferred embodiment of the present invention further includes a middle cup 300. The middle cup 300 fits coaxially around the interior cup 200. The middle cup 300 has a generally cylindrical structure, having a stepped diameter, that extends from a second inlet end 302 to a second outlet end 304. A second receptacle portion 306 is located adjacent the second inlet end 302. The second receptacle portion 306 has a second inner mating surface 316 that may be adapted to fit against the first outer mating surface 218 of the interior cup 200. The second receptacle portion 306 also has a second outer mating surface 318 that extends along at least a portion of the second receptacle portion 306. The second outer mating surface 318 may be sized to fit within and/or against the exterior cup 400.

A second outlet portion 308 preferably extends substantially coaxially along the cylindrical axis of the middle cup 300 from the second receptacle portion 306 to the second outlet end 304. The average diameter of the second outlet portion 308 is preferably less than the average outer diameter of the second receptacle portion 306.

The second receptacle portion 306 and the second outlet portion 308 have a second interior surface 312 that extends from the second inner mating surface 316 to the second outlet end 304. In the embodiment depicted in FIG. 3A, the second interior surface 312 has two substantially cylindrical portions (one in the second receptacle portion 306 and another in the second outlet portion 308) that are joined by a disk-like portion. The second interior surface 312 is designed to generally follow the contour of the first exterior surface 210 without contacting it, so that an inner annular passage 314 (see FIG. 1) is formed between the interior cup 200 and the middle cup 300.

The inner annular passage 314 may have any width (as measured by the radial distance between the first exterior surface 210 and the second interior surface 312 at the second outlet end 304) that is sufficient to provide the desired flow rate and other flow properties of the fuel or nitrous oxide passing therethrough. For example, the inner annular passage 314 may have a width of between about 0.008 and about 0.030 inches. In one embodiment the width may be about 0.013 to about 0.014 inches. Other sizes may also be desirable.

The second receptacle portion 306 and the second outlet portion 308 have a second exterior surface 310 that extends from the second outer mating surface 318 to the second outlet end 304. In the embodiment depicted in FIG. 3A, the second exterior surface 310 is substantially parallel with the second interior surface 312, and thus has two substantially cylindrical portions (one in the second receptacle portion 306 and another in the second outlet portion 308) that are joined by a disk-like portion.

Referring now to FIG. 3B, the middle cup 300 may further comprise a middle outer sleeve portion 320 that extends between the second outer mating surface 318 and the second inlet end 302. The middle outer sleeve portion 320 has an inner annular passage inlet 322 through which fuel or nitrous oxide may pass into the inner annular passage 314. The inner annular passage inlet 322 may be sized to provide the desired amount of fuel or nitrous oxide flow. Sizing of the inner annular passage inlet 322 may be accomplished by fabricating the inlet 322 to have a particular diameter corresponding with the desired flow rate or rates for the fuel or nitrous oxide operating pressure range, or the desired power output of the engine. The inner annular passage inlet 322 may also be fabricated to hold permanent or replaceable orifice jets (not shown), which may be inserted into the inner annular passage inlet 322 to reduce the diameter thereof to obtain the desired flow rates. The size of the inner annular passage inlet 322 will depend on the details of the system being designed, and one skilled in the art will be able to provide suitable fixed or jetted inner annular passage inlets 322 for a given application without undue experimentation.

The middle cup 300 may also have a middle cup fitting boss 324 for attaching a supply of fuel or nitrous oxide to the inner annular passage inlet 322. The middle cup fitting boss 324 may be adapted to receive any suitable hose (see item 326 in FIG. 9) or fitting (see item 328 in FIG. 9). For example, the middle cup fitting boss 324 may be threaded and shaped to receive flared end fittings or pipe fittings made from brass, steel, aluminum or other materials. Exemplary fittings are #3 AN flared fittings and ⅛" NPT pipe fittings available from Earl's Performance Plumbing, a company headquartered in Bowling Green, Ky. The fittings are ideally positioned within the nozzle 100 such that there are no volumes that allow fluids passing from the fittings to the nozzles 100 to expand and change phase. The selection and use of fittings and hoses to convey nitrous oxide and fuel are known in the art, and a skilled artisan will be able to employ a suitable plumbing system without undue experimentation.

In a preferred embodiment, the inner annular passage inlet 322 is oriented relative to the inner annular passage 314 to obtain ideal flow of the nitrous oxide or additional fuel passing therethrough. For example, in one embodiment, the inner annular passage inlet 322 is angled to project nitrous oxide or additional fuel into the inner annular passage 314 at a slight angle towards the second outlet end 304. Also in this embodiment, the inner annular passage inlet 322 is oriented to project the nitrous oxide or additional fuel tangentially into the inner annular passage 314. It has been found that this orientation creates a beneficial swirling flow in the fluid, and provides a homogeneous mixture to the second outlet end 304. The slight downward angle may be restricted, however, by the need to drill the inner annular passage inlet 322 without compromising the structure of the nozzle 100, particularly the middle cup fitting boss 324. Thus, the maximum value for this angle may be limited by fabrication concerns, as will be understood by those skilled in the art.

Referring now to FIG. 4A, a preferred embodiment of the present invention further comprises an exterior cup 400. The exterior cup 400 preferably fits substantially coaxially around all or part of the middle cup 300. The exterior cup 400 also has a generally cylindrical structure, having a stepped diameter, that extends from a third inlet end 402 to a third outlet end 404. A third receptacle portion 406 is located adjacent the third inlet end 402. The third receptacle portion 406 has a third inner mating surface 416 that may be adapted to fit against the second outer mating surface 318 of the middle cup 300. The outer surface of the third receptacle portion 406 comprises an exterior outer sleeve portion 420.

A third outlet portion 408 extends coaxially along the cylindrical axis of the exterior cup 400 from the third receptacle portion 406 to the third outlet end 404. The average diameter of the third outlet portion 408 is preferably less than the average outer diameter of the third receptacle portion 406.

The third receptacle portion 406 and the third outlet portion 408 have a third interior surface 412 that extends from the third inner mating surface 416 to the third outlet end 404. In the embodiment depicted in FIG. 4A, the third interior surface 412 has two substantially cylindrical portions (one in the third receptacle portion 406 and another in the third outlet portion 408) that are joined by a disk-like portion. The third interior surface 412 is designed to generally follow the contour of the second exterior surface 310 without contacting it, so that an outer annular passage 414

(see FIG. 1) is formed between the middle cup 300 and the exterior cup 400.

The outer annular passage 414 may have any width (as measured by the radial distance between the second exterior surface 310 and the third interior surface 412 at the third outlet end 404) that is sufficient to provide the desired flow rate and other flow properties of the fuel or nitrous oxide passing therethrough. For example, the outer annular passage 414 may have a width of between about 0.010 and about 0.045 inches. In one embodiment the width may be about 0.020 to about 0.021 inches. Other sizes may also be desirable.

The third outlet portion 408 has a third exterior surface 410 that extends from the exterior outer sleeve portion 420 to the third outlet end 404. The third exterior surface 410 is adapted to fit into the fuel injector receptacle 104 of an engine intake plenum 106. The shape of the third exterior surface 410 is preferably designed to allow the nozzle 100 to be interspersed between the spark plug 102 and the intake plenum 106 while keeping the spark plug 102 as close to its original position as possible. In a preferred embodiment, the third exterior surface 410 may be designed to fit within many different types of intake plenum 106. Also in a preferred embodiment, the third exterior surface 410 is designed to fit within a fuel injector receptacle 104 of an engine without machining or reinforcing the intake plenum 106 or making any other substantial modification to the engine. Although the invention is generally described herein as being installed into an intake plenum 106, it will be understood by those in the art that the present invention may be installed into any fuel injector receptacle 104, regardless of whether it is located in the intake plenum 106 or any other part of the engine.

As can be seen in FIG. 4B, the exterior outer sleeve portion 420 has an outer annular passage inlet 422 through which fuel or nitrous oxide may pass into the outer annular passage 414. The outer annular passage inlet 422 may be sized to provide the desired amount of fuel or nitrous oxide flow. Sizing of the outer annular passage inlet 422 may be accomplished in the same manner as sizing of the inner annular passage inlet 322; that is, by providing it with a fixed size or a permanent or replaceable orifice jet fitting. One skilled in the art will be able to provide suitable fixed or jetted outer annular passage inlets 422 for a given application without undue experimentation.

The exterior cup 400 may also have an exterior cup fitting boss 424 for attaching a supply of fuel or nitrous oxide to the outer annular passage inlet 422. The exterior cup fitting boss 424 may be adapted to receive any suitable hose (see item 426 in FIG. 9) or fitting (see item 428 in FIG. 9). The exterior cup fitting boss 424 may be made in substantially the same manner as the middle cup fitting boss 324, as described elsewhere herein.

In a preferred embodiment, the outer annular passage inlet 422 is oriented relative to the outer annular passage 414 to obtain ideal flow of the nitrous oxide or additional fuel passing therethrough. For example, in one embodiment, the outer annular passage inlet 422 is angled to project nitrous oxide or additional fuel into the outer annular passage 414 at a slight angle towards the third outlet end 404. Also in this embodiment, the outer annular passage inlet 422 is oriented to project the nitrous oxide or additional fuel tangentially into the outer annular passage 414. It has been found that this orientation creates a beneficial swirling flow in the fluid, and provides a homogeneous mixture to the third outlet end 404. The slight downward angle may be restricted, however, by the need to drill the outer annular passage inlet 422 without compromising the structure of the nozzle 100, particularly the exterior cup fitting boss 424. Thus, the maximum value for this angle may be limited by fabrication concerns, as will be understood by those skilled in the art.

The interior, middle and exterior cups 200, 300, 400 may be made from any suitable material. Suitable materials include those that can withstand the temperatures and vibrations of internal combustion engines and engine compartments without significant degradation. Exemplary materials include brass, aluminum, steel, and plastic. The materials preferably are easily and economically machined or cast into the desired shapes. Metals may, for example, be machined using a 4-axis turning center (i.e., computer numerical control (CNC) machining), and plastics may be injection molded.

Metal embodiments may also be fabricated more economically by starting the machining process with extrusions having cross sections that are specially-shaped to form the cups. Extrusions, such as the one depicted in FIG. 5, may be shaped such that the final part requires substantially less machining and wasted material than it would if it were fabricated from metal provided with a conventional cross section, such as round and rectangular bar stock. Such shapes may be said to provide a net-shape machining advantage. The extrusion 500 depicted in FIG. 5 is an "ear lobed" extrusion that may be used to more economically machine the middle cup 300 and exterior cup 400. The ear lobed extrusion 500 comprises a circular portion 502 which may have a diameter and shape suitable for use as the middle and exterior outer sleeve portions 320, 420 of the cups without having to be machined. The extrusion 500 further comprises an earlobe portion 504 which may be suitable to form the middle cup fitting boss 324 and exterior cup fitting boss 424 with little or no machining. In some cases, the extrusion may also have a hole 506 that may require little additional machining to form the second interior surface 312 and third interior surface 412, however an ear lobed extrusion may not have a hole therein. Other extrusion shapes may be also be used to provide manufacturing advantages.

Figure 6:
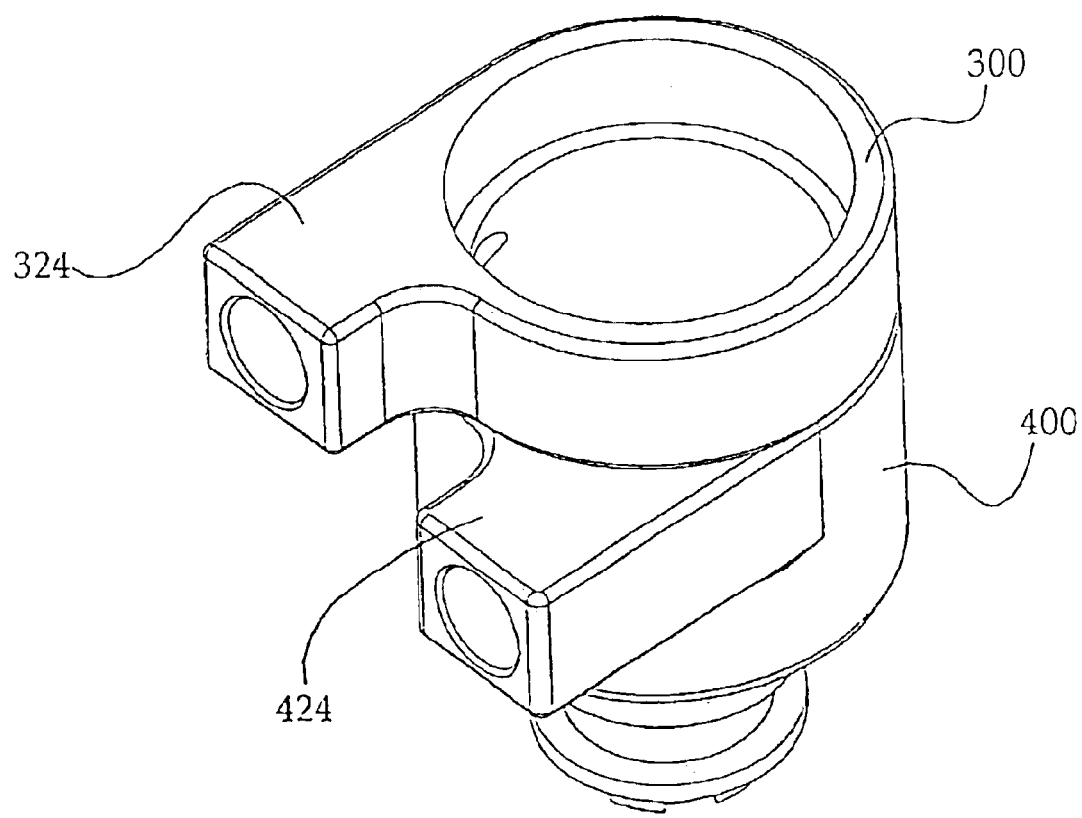
FIG. 6 is an isometric view of the middle and exterior cups according to a preferred embodiment of the present invention that may be fabricated from the extrusion of FIG. 5.

FIG. 6 shows an embodiment of the present invention that has been partly fabricated from an extrusion similar to that shown in FIG. 5. In the embodiment of FIG. 6, the middle cup 300 and exterior cup 400 are fabricated from identical extrusions (the interior cup 200 is not shown in FIG. 6).

As can be seen most clearly in FIG. 1, the interior, middle, and exterior cups 200, 300, 400 may be nested within one another to form a nozzle 100. The interior cup 200 is held in place within the middle cup 300 by contact between the first outer mating surface 218 and the second inner mating surface 316. The middle cup 300 is held in place within the exterior cup 400 by contact between the second outer mating surface 318 and the third inner mating surface 416. The interior cup 200, middle cup 300, and exterior cup 400 may be press fit together to have an interference or friction fit that will not separate during normal use, or they may be attached to one another by bonding with high-strength and high-temperature epoxies or glues, welding, or any other suitable method. For example, in an embodiment in which the cups are made from plastic, the cups may be press fit, ultrasonically welded, or adhesively bonded to one another. Metal embodiments may be brazed, laser welded, micro-arc TIG (tungsten/inert gas) welded, and the like. Other assembly methods will be apparent to those skilled in the art with reference to the teachings herein.

Although the connection between the first outer mating surface 218 and second inner mating surface 316 and the second outer mating surface 318 and third inner mating surface 416 may be sufficient to hold the three cups rigidly in place, it may also be desirable to supplement the hold provided by these surfaces.

Figure 7:
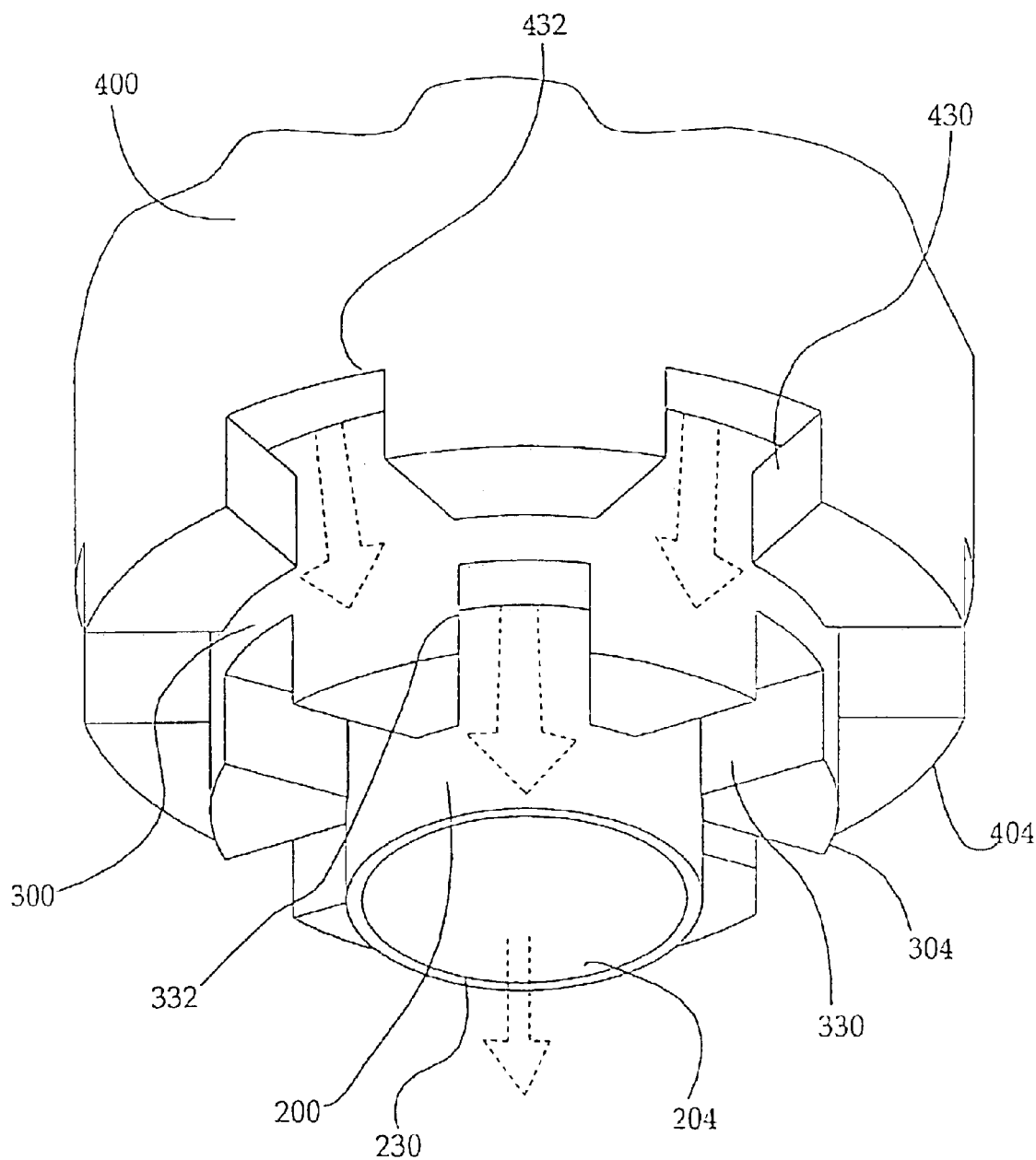
FIG. 7 is a view of the outlet ends of the cups according to a preferred embodiment of the present invention showing the passage of fuel and nitrous oxide therethrough.

Referring now to FIG. 7, there is shown an embodiment of the invention in which the middle cup 300 and exterior cup 400 have been provided with additional structures to hold them in place at their respective outlet ends relative to one another. FIG. 7 is a view of the outlet ends of an embodiment of the present invention, shown as assembled. The first outlet end 204 of the interior cup 200 is shown protruding slightly from the second outlet end 304 of the middle cup 300, which, in turn, is protruding slightly from the third outlet end 404 of the exterior cup 400. The first outlet end 204 has a circumferential edge 230 that is substantially flat in a plane perpendicular to the interior cup's cylindrical axis. The edge 230 may be sharp, so that it encourages shearing of the fuel exiting the inner cup 200. The second outlet end 304 is provided with a number of middle cup fingers 330 that extend radially from the second interior surface 312 to the first exterior surface 210 and hold the middle cup 300 in place relative to the interior cup 200. The third outlet end 404 is provided with a number of exterior cup fingers 430 that extend radially from the second interior surface 312 to the first exterior surface 210, and hold the exterior cup 400 in place relative to the middle cup 300. Nitrous oxide or fuel passes from the inner and outer annular passages 314, 414, between the fingers 330, 430, and eventually into the airstream moving to the engine intake valves. The path of the fuel and nitrous oxide is indicated by arrows in FIG. 7.

Improved engine performance can typically be obtained by increasing the degree to which the fuel and nitrous oxide is atomized and mixed (homogenized). The nozzle 100 preferably provides a low penetrating, diffuse, and highly atomized spray of mixed nitrous oxide and fuel. This spray pattern also helps prevent the nitrous oxide and fuel combination from rebounding back into the intake plenum when the intake valve is closed. The coaxial flow pattern of the nitrous oxide and additional fuel (if any) of the present invention may also be tuned to encourage improved atomization of the fuel metered through the fuel injector 102. In operation, fuel metered through the fuel injector 102 passes through the central fuel injector passage 214. At approximately the same time, nitrous oxide passing through the inner and outer annular passages 314, 414 is throttled out of the second and third outlet ends 304, 404 of the nozzle 100. The pressurized nitrous oxide, originally in a liquid state, flashes into a gaseous state upon being throttled out of the nozzle 100. As the fuel from the fuel injector 102 passes the first outlet end 204 of the nozzle, it is sheared off by the expanding nitrous oxide plume emitted from the inner and outer annular passages 314, 414, enhancing the fuel atomization. In embodiments in which additional fuel is provided through the nozzle 100 (wet systems), the additional fuel is preferably metered through the inner annular passage 214, so that when the additional fuel exits the inner annular passage it is also sheared off by the expanding nitrous oxide plume.

The inner and outer annular passages 314, 414 and the first, second, and third outlet ends 204, 304, 404 may be designed to provide optimal flow and atomization, such as by being shaped to avoid premature phase changes in the fluids and to generate a highly diffuse, low inertia, gaseous nitrous oxide spray plume. For example, in the embodiment depicted in FIG. 7, the inner and outer annular passages 314, 414 may have smooth walls to avoid unwanted phase changes, and the interior surfaces of the second and third outlet ends 304, 404 are provided with castellations 332, 432 that promote the mixture of the fuel, air, and nitrous oxide. It has been found that castellations 332, 334 having square cut sides, such as those in FIG. 7, provide improved fuel atomization and homogenization, particularly in relatively low-revving engines. The castellations generate a flow condition, sometimes referred to as "tumble flow," that is created when the nitrous oxide and fuel mixture collapses after leaving the nozzle 100. This collapsing action occurs when fluids are drawn towards a low pressure region within a high pressure conical flow, and is often referred to as the Coanda effect.

In other embodiments designed for relatively high-revving engines, the castellations 332, 334 may be manipulated to generate what is sometimes referred to as "swirl flow." Swirl flow creates an annular hollow spray plume that carries the highly atomized and homogenized nitrous oxide and fuel mixture along the intake to the valves. Swirl flow may be encouraged by offsetting and angling the castellations 332, 432.

The second and third outlet castellations 332, 432 may be any size suitable to provide the desired tumble, swirl, or other flow conditions. In an embodiment designed to generate tumble flow, for example, the second outlet castellations 332 may have a width of between about 0.020 and about 0.100 inches and a depth (distance from the second outlet end 304) of between about 0.010 and about 0.040 inches. Also in this embodiment, the third outlet castellations 432 may have a width of between about 0.050 and about 0.150 inches and a depth (distance from the third outlet end 404) of between about 0.010 and about 0.060 inches.

Additional measures may be taken to promote swirl or tumble flow conditions, such as contouring the first and second exterior surfaces 210, 310 and second and third interior surfaces 312, 412 to contour the inner and outer annular passages 314, 414. For example, the annular passages may be provided with counter-rotating helical ridges to promote counter-rotating swirl flow. The fingers 330, 430 may also cooperate with the castellations 332, 432 to promote swirl and tumble flow. Other shapes may also be made in any of the first, second, and third outlet ends 204, 304, 404 to promote mixture of the nitrous oxide, fuel and air, and other variations will be apparent to those skilled in the art with reference to the teachings herein, and are within the scope of this invention. For example, an embodiment of the invention may be constructed having no castellations 332, 432 or fingers 330, 430. The foregoing explanation of how the present invention operates is exemplary only, and the present invention is not intended to be limited to any particular theory of operation.

In both tumble flow and swirl flow applications, fuel "choke-off" may occur if the nitrous oxide plume is allowed to encroach too greatly on the central fuel injector passage 214 (and any annular passage 314 conveying additional fuel in wet systems). Choke-off occurs when a relatively high pressure nitrous oxide plume obstructs the flow of relatively low pressure fuel. It has been found that choke-off may be reduced or eliminated by staggering the outlet ends 204, 304, 404. As can be seen in FIG. 7, the first outlet end 204 preferably protrudes farther from the nozzle 100 than the second outlet end 304, and the second outlet end 304 preferably protrudes farther than the third outlet end 404. The proper amount of stagger may vary between applications. For example, a stagger distance between successive outlet ends of about 0.010 to about 0.100 inches may provide a useful reduction in choke-off. It has been found that a stagger distance between successive outlet ends of about 0.050 inches is useful in some applications.

This staggered relationship prevents the nitrous oxide plume from encroaching too greatly upon the fuel supplies, thereby reducing choke-off. In addition, it has been found that indexing the castellations 332, 432 (i.e., staggering the castellations 332, 432 around the circumference of the nozzle 100) reduces choke-off, and may eliminate it altogether. For example, the embodiment of FIG. 7 uses indexed castellations 332, 432 that are staggered about the circumference of the nozzle 100. The fingers 330, 430 may also help reduce choke-off by blocking a portion of the flow at each finger 330, 430.

The staggered relationship between the first, second, and third outlet ends 204, 304, 404 may also be necessary or desirable to allow the nozzle 100 to be fitted into various types of fuel injector receptacle. Such a nozzle 100 may be fitted into engines produced by various manufacturers and engines intended to be used with various different types of fuel injector 102.

The additional atomization and flow characteristics provided by the present invention are advantageous over conventional nitrous oxide systems, and may provide increased power output and efficiency with a reduced likelihood of damage to the engine and a reduced need for modifying the engine. Conventional nitrous oxide systems in multipoint fuel injected engines typically do not provide a significant increase in the atomization of the fuel metered through the original fuel injector because conventional nitrous oxide nozzles can not be placed in the intake plenum such that they are aimed towards the tip of the fuel injector. Furthermore, conventional nitrous oxide systems used with MPFI engines can not be adapted to provide tumble flow and swirl flow and to prevent fuel choke-off with the same degree and ease of control as the present invention.

The performance improvements provided by the present invention will depend on the above factors, such as providing improved flow and reduced choke-off, and also upon the amount of fuel and nitrous oxide that are provided to the engine. In embodiments of the invention in which both the inner and outer annular passages 314, 414 are used to convey nitrous oxide (dry systems), the increase in power output may be limited by the ability of the fuel pump to deliver fuel to the engine. In wet systems (in which one of the annular passages meters additional fuel into the engine), the increase in power output may be limited only by the structural integrity of the engine. The amount of additional fuel (if any) and nitrous oxide provided to the engine will depend on the sizes of the inner and outer annular passage inlets 322, 432, the inner and outer annular passages 314, 414, the fingers 330, 430, the castellations 332, 432, and other factors that will be apparent to those skilled in the art with reference to the teachings herein. The amount and proportions of fuel and nitrous oxide provided by the present invention will also depend on the fuel and nitrous oxide pressures and the metering capabilities of the nitrous oxide system.

In one exemplary application, a nozzle 100 of the present invention was adapted to operate with a 1999 Mustang GT ('99 Mustang), available from Ford Motor Company, headquartered in Deerborn, Mich. The '99 Mustang engine was a 4.6 liter single overhead cam design. A preferred embodiment of the present invention was installed between each fuel injector 102 and the intake plenum of the '99 Mustang. The fuel injectors 102 were the original Denso F1ZE-C2A fuel injectors provided with the '99 Mustang. The embodiments were operated as a wet system, wherein additional fuel was provided through the inner annular passage 314 and nitrous oxide was provided through the outer annular passage 414.

The system, as installed in all eight fuel injector positions, each comprised a substantially identical brass nozzle 100. Each nozzle 100 had a central fuel injector passage minimum diameter of about 0.104 inches that opened at a taper angle of 2 degrees to the first outlet end 204, which was located about 0.690 inches from the of the fuel injector tip 110. Each nozzle's inner annular passage 314 had a width of about 0.013 to about 0.014 inches. The castellated second outlet end 304 was staggered about 0.050 inches back from the first outlet end 204. Each of the six, evenly-spaced castellations 332 was about 0.060 inches wide and extended about 0.024 inches from the second outlet end 304. Each nozzle's outer annular passage 414 had a width of about 0.020 to about 0.021 inches. The castellated third outlet end 404 was staggered about 0.050 inches back from the second outlet end 304. Each of the six, evenly-spaced castellations 432 was approximately 0.094 inches wide and extended about 0.030 inches from the third outlet end 404.

The fuel flow rate of the original fuel injector 102 was about 19 pounds per hour (pph). Supplemental fuel was provided through the inner annular passage 314 at 43 pounds per square inch (psi), and at a flow rate of about 10 pph through a 0.012 inch orifice jet. Nitrous oxide was provided through the outer annular passage 414 at 950psi, and at a flow rate of about 98 pph through a 0.018 inch orifice jet.

Figure 8:
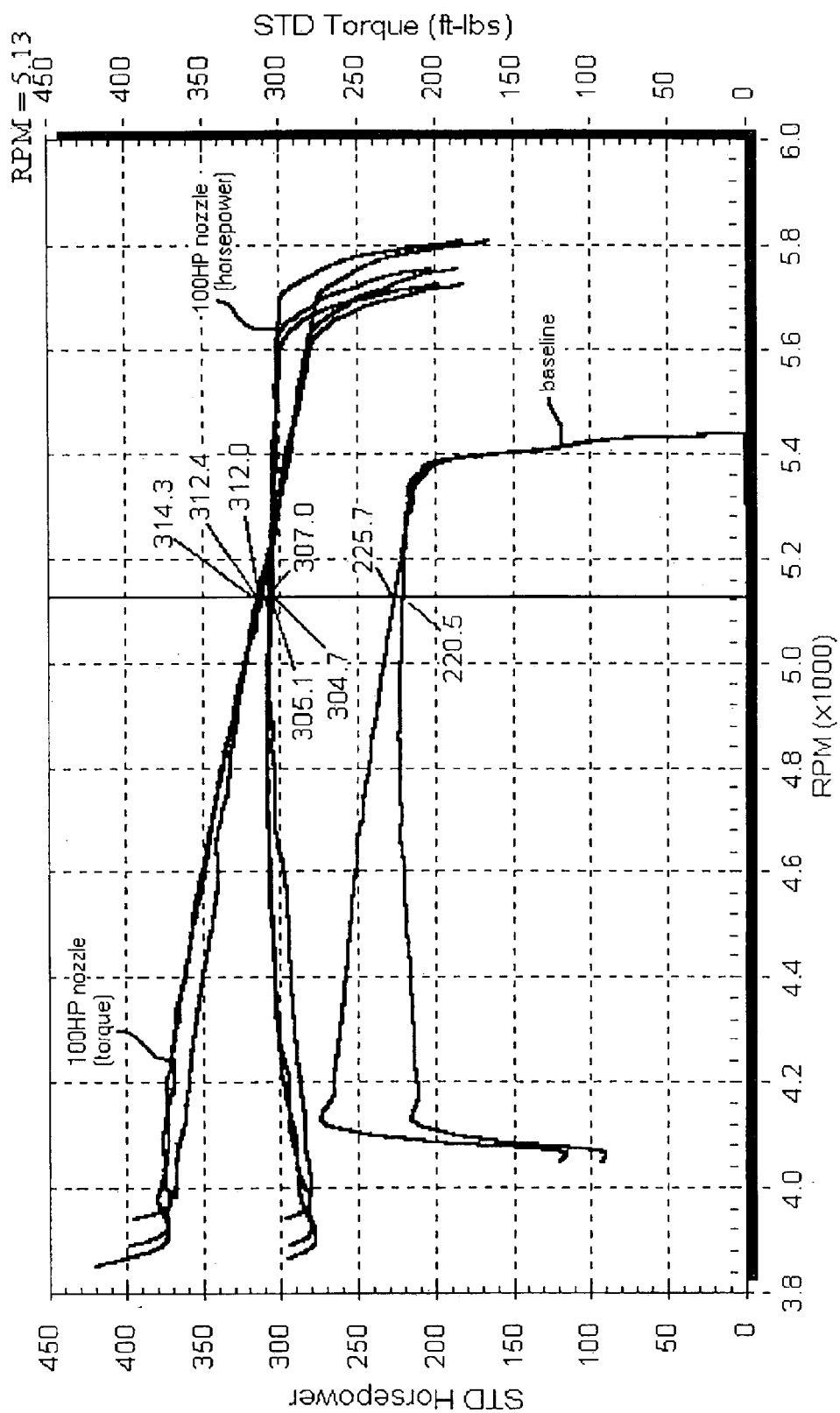
FIG. 8 is a graph showing comparative horsepower and torque of a conventional engine and an engine equipped with the invention according to one preferred embodiment.

The '99 Mustang was operated on a chassis dynamometer that measured the power and torque output at the driven rear wheels of the automobile. Friction losses through the drivetrain of the '99 Mustang were estimated at about 20% to 25%. Several tests were run, and the results of a typical dynamometer test are shown in FIG. 8. The dynamometer tests indicated that the above-described exemplary embodiment of the present invention provided a power increase of about 85 hp, and a torque increase of about 100 ft-1bf, both of which were present throughout the engine's range of operating speeds—a performance increase of about 38% to about 45%. After discounting drivetrain friction losses, the exemplary embodiment of the present invention provided a power increase of about 100 hp, and a torque increase of about 125 ft-1bf.

The dimensions of the various parts of the present invention may ultimately be constrained by several considerations, including: the strength and machinability or castability of the material, the size of the fuel injector 102, the size of the fuel injector receptacle 104 in the intake plenum 106 (or other structure into which the nozzle is to be inserted), and the amount of room available in the engine or engine compartment. It has been found that the shape of the embodiment of FIG. 1 (two cylindrical portions, one having a larger diameter than the other, that are joined by a perpendicular disk-like portion) allows the overall size of the nozzle 100 to be reduced and places the fuel injector nozzle 110 close to the position it would be in if the present invention were not installed. In other embodiments, in which there may be ample space to install the present invention, the nozzle 100 may have other configurations, as will be apparent to those skilled in the art with reference to the present invention.

Figure 9:
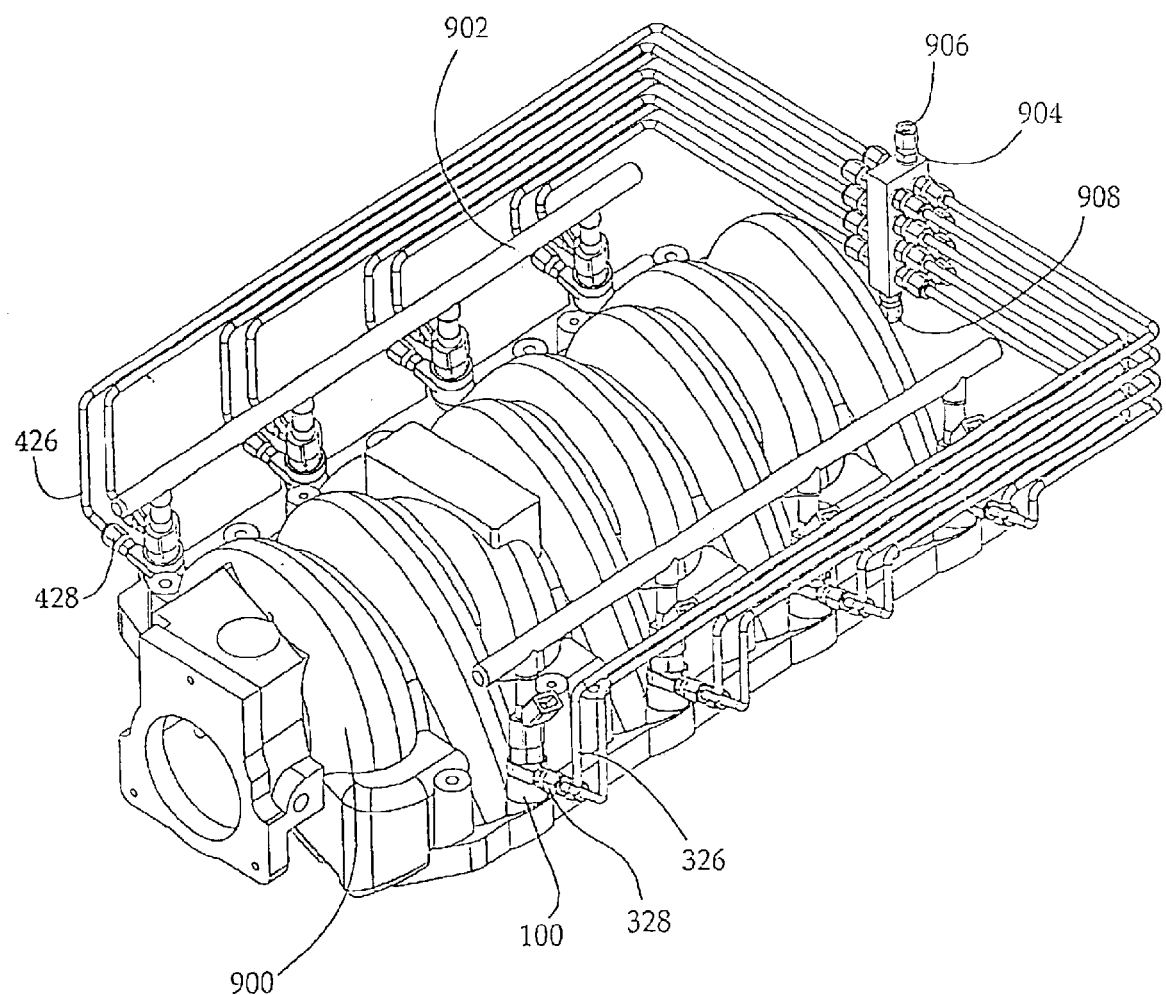
FIG. 9 is an isometric view of a nitrous oxide system installed on an intake plenum according to one preferred embodiment of the present invention.

Referring now to FIG. 9, an embodiment of the present invention has also been adapted to operate within the confines of an engine compartment without modifying the intake plenum 106 or the engine compartment environment. FIG. 8 shows eight identical nozzles 100 of the present invention installed on a LS1 (Corvette) engine, available from General Motors Corporation, headquartered in Detroit, Mich. The nozzles 100 are installed between the eight original factory fuel injectors 102 and the intake plenum 900. Fuel rails 902 are attached to the fuel injectors 102 to supply fuel to the fuel injectors 102. Each nozzle 100 is connected to a two channel distribution block 904 by tubes, pipes or hoses. Each channel of the distribution block 904 provides a separate passage for fuel or nitrous oxide, and each channel is adapted to be fluid- and air-tight. A first set of hoses 326 connects the first channel of the distribution block 904 to each of the middle cup fitting bosses 324 (and thus to the inner annular passage inlets 322). An orifice jet may be positioned within the middle cup fitting bosses 324, or within the middle cup fittings 328. A second set of hoses 426 connects the second channel of the distribution block 904 to each of the exterior cup fitting bosses 424 (and thus to the outer annular passage inlets 422). Orifice jets may be located within the exterior cup fitting bosses 424 or within the exterior cup fittings 428. The configuration of FIG. 9 may be adapted to work with wet nitrous systems and dry nitrous systems. In a wet system, the first channel of the distribution block 904 is provided with additional fuel through the first channel inlet 906, and the second channel is provided with nitrous oxide through the second channel inlet 908. In a dry system, both channels are provided with nitrous oxide.

The assembly shown in FIG. 9 demonstrates how the installation of the nozzles 100 of the present invention may raise the fuel injectors 102 and the fuel injector rails 902 away from their original position, thereby raising the "stack height" of the injector rails 902. In many MPFI engines, the engine or engine compartment (i.e., engine accessories and the hood) are designed to be as compact as possible, particularly in the area around the fuel rails 902, which normally sit relatively high on the engine. Government safety regulations, industry standards and safety concerns may dictate that the fuel rails 902 be located a certain distance from the hood of the automobile or other objects. Where space constraints and regulations apply, it may be preferable to provide nozzles 100 that add as little stack height as possible.

In one preferred embodiment of the invention, the nozzles 100 may be designed to provide the benefits of the present invention, while only raising the stack height of the fuel rails 902 and injectors 102 by about 0.25 inches to about 1.25 inches. In the LS1 application depicted in FIG. 9 the nitrous oxide assembly is configured using an embodiment of the present invention as depicted in FIG. 6. In the LS1 application; the stack height of the fuel rails 902 and injectors 102 is increased by about 1.625 inches, keeping them within government regulations and industry standards.

The present invention preferably may be installed without making substantial modifications to the engine. A nozzle constructed according to a preferred embodiment of the present invention may be installed by removing the fuel injectors from the engine's fuel injector receptacles, installing the nozzles in the fuel injector receptacles, and installing the fuel injectors into the nozzles. Once installed, a standard nitrous oxide system may be attached to the nozzles in a conventional manner. No machining is required to install the nozzles, so the intake plenum or other parts of the engine do not have to be removed to prevent contamination of the engine. In some cases, such as the '99 Mustang and '00 Mustang applications described previously, the fuel rails 902 or other components have mounting brackets that may have to be modified to account for the additional stack height caused by the insertion of the nozzles. For example, in the '99 Mustang and '00 Mustang applications, the fuel rails 902 where raised by about 0.60 inches to install the nozzles 100. This modification may typically be done by using a simple spacing block between the mounting brackets and their original mounting position. Such spacing blocks may be provided in a kit in which an embodiment of the present invention is sold.

When designing an embodiment of the present invention for a particular application, the factors discussed herein and other factors (e.g., desired performance improvement, fluid flow rates, physical limitations of the materials, physical constraints of the installation environment, and so on) should be balanced to create a suitable nozzle 100. One skilled in the art will be able to calculate or otherwise determine the proper dimensions for a nozzle 100 of the present invention for a given application based on the teachings herein.

Although the embodiments herein have been described with reference to a three-cupped design having separate bosses and annular passage inlets on two of the three cups, in other embodiments, a single cup may have both annular passage inlets in it. In such an embodiment, a single cup may be equipped with a boss having both inlets, and fittings may be attached to that cup. Examples of such embodiments are depicted in FIGS. 10, 11, 12, and 13.

Figure 10:
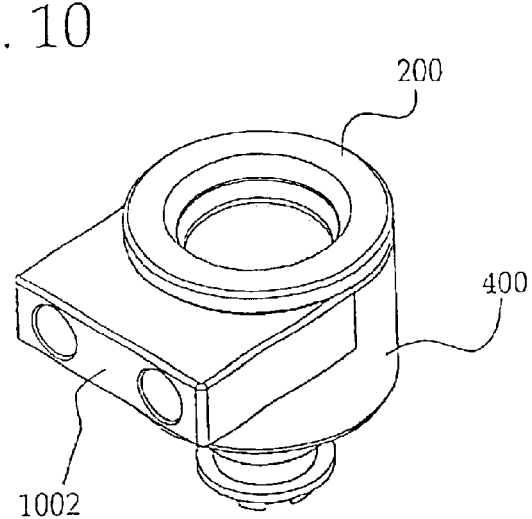
FIG. 10 is an isometric view of an embodiment of the present invention using a single boss for both fittings.
Figure 11:
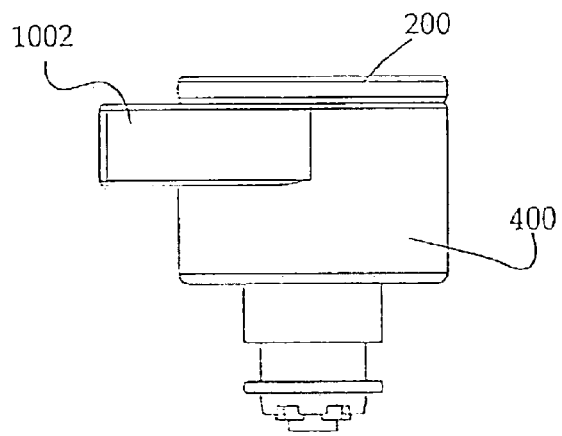
FIG. 11 is a side view of the embodiment of FIG. 10.

FIGS. 10 and 11 are isometric and side views, respectively, of an alternative embodiment of the present invention in which both the inner annular passage inlet 322 and the outer annular passage inlet 422 are provided through a single boss 1002 associated with the outer cup 400. In this embodiment, the inner cup 200 forms a portion of the outer surface of the nozzle 100.

Figure 12:
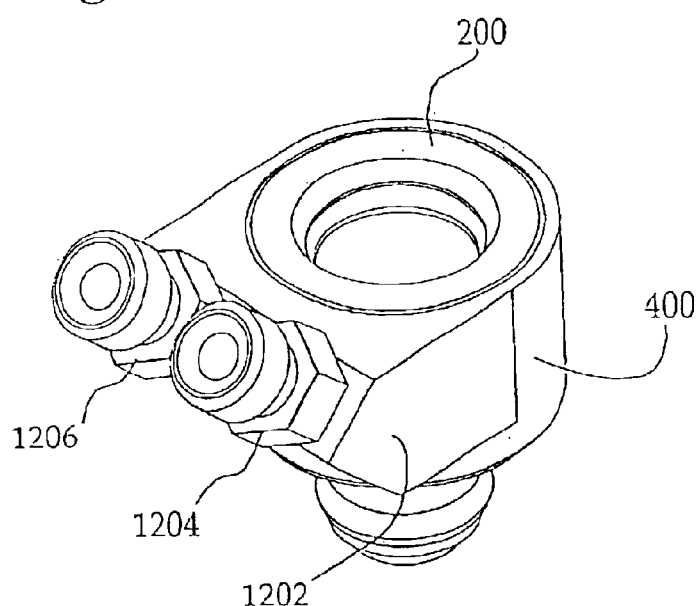
FIG. 12 is an isometric view of an embodiment of the present invention using a single boss for both fittings; and, FIG. 13 is a side view of the embodiment of FIG. 12.
Figure 13:
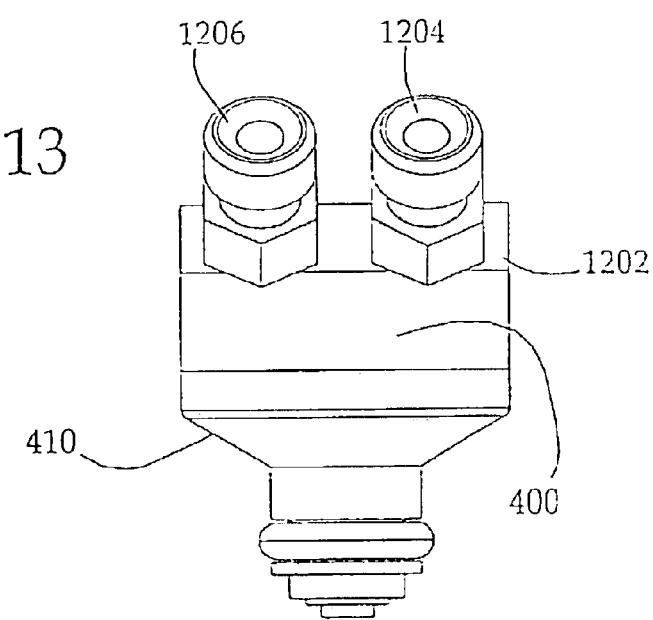

FIGS. 12 and 13 are isometric and side views, respectively, of another alternative embodiment of the present invention in which both the inner annular passage inlet 322 and the outer annular passage inlet 422 are provided through a single boss 1202 associated with the outer cup 400. In this embodiment, the outer cup 400 forms the entire outer surface of the nozzle. In this embodiment, the boss 1202 is angled to allow the inner annular passage inlet fitting 1204 and outer annular passage inlet fitting 1206 to be positioned at an angle relative to the axis of the nozzle, providing simpler or more compact installation in some applications. Also in this embodiment, a portion of the third exterior surface 410 is tapered to allow the nozzle 100 to be fitted more securely, compactly, or both into a fuel injector receptacle 104.

A further use for the present invention is to provide alternative fuels to power the engine or to supplement the flow of conventional fuels. An embodiment of the invention may be adapted to have alternative fuels, such as propane, alcohol, alcohol blended with other fuels, compressed and liquid natural gas and the like, flow through one, both, or all three passages. Alternative fuels may be used to provide a cheaper, more efficient, cleaner, or otherwise desirable source of energy to internal combustion engines. Other alternative fuels, such as alcohol and alcohol blends, may also be useful for providing more powerful engines.

In recent years, some automobile manufacturers have produced engines designed specifically for using alternative fuel vehicles, but there is still a need to adapt conventional gasoline engines to use alternative fuel vehicles. In some cases it may be desirable to convert a conventional engine to run on alternative fuels at all times (dedicated engines), in which case the original fuel injectors may be discarded entirely. In other cases, it may be desirable to operate the vehicle on conventional fuels at some times and alternative fuels at other times (a hybrid engine). Hybrid engines are particularly useful if the alternative fuel source is only locally available, and longer trips are required of the vehicle. The present invention provides a convenient and effective way to provide alternative fuel to both dedicated and hybrid alternative fuel engines.

In an embodiment adapted for use with a dedicated alternative fuel engine, the conventional fuel injector may be replaced by an alternative fuel supply to supply fuel through the central fuel injector passage 214, and additional alternative fuels may be supplied through one or both of the annular passages 314, 414. Nitrous oxide may also be provided with the alternative fuels.

In an embodiment of the invention adapted for use with a hybrid alternative fuel engine, the various passages may be adapted to provide different fuels to the engine. For example, the conventional fuel system may be retained and a conventional fuel injector 102 may be used to provide gasoline through the central fuel injector passage 214, while propane or compressed natural gas is supplied to one or both of the annular passages. Yet another alternative fuel or other reactant, like nitrous oxide, may be supplied the third passage. In such an embodiment, gasoline may be used to power the engine at some times, and at other times the alternative fuel or fuels may be used to power the engine. In some cases, an alternative fuel may be used simultaneously with conventional fuels or other alternative fuels or combustion reactants.

Other embodiments, uses and advantages of the invention will be apparent to those skilled in the art from consideration of the specification and practice of the invention disclosed herein. For example, an embodiment may be fabricated from fewer or more than three separate cups, or an embodiment may be constructed having more or less than two annular passages, or an embodiment may be fabricated having an inoperative ("blanked") annular passage, and so on. The present invention may also be used with single point fuel injection systems by placing an embodiment of the invention between the single point fuel injector and its receptacle in the engine. The specification should be considered exemplary only, and the scope of the invention is defined by the following claims.

What is claimed is:

1. A nozzle for providing nitrous oxide to an internal combustion engine, the nozzle comprising:
   a central fuel injector passage terminating at a first outlet end for passing fuel from a fuel injector therethrough;
   an inner annular passage arranged circumferentially around the central fuel injector passage, and terminating at a second outlet end; and
   an outer annular passage arranged circumferentially around the inner annular passage, and terminating at a third outlet end;
   wherein one or both of the inner and outer annular passages is adapted to pass nitrous oxide therethrough; and
   wherein the second outlet end comprises second outlet castellations.

2. The nozzle of claim 1, wherein the second outlet castellations have a width of between about 0.020 and about 0.100 inches and a depth of between about 0.010 and about 0.040 inches.

3. The nozzle of claim 1, wherein the second outlet casteillations have a width of about 0.060 inches and a depth of about 0.024 inches.

4. A nozzle for providing nitrous oxide to an internal combustion engine, the nozzle comprising:
   a central fuel injector passage terminating at a first outlet end for passing fuel from a fuel injector therethrough;
   an inner annular passage arranged circumferentially around the central fuel injector passage, and terminating at a second outlet end; and
   an outer annular passage arranged circumferentially around the inner annular passage, and terminating at a third outlet end;
   wherein one or both of the inner and outer annular passages is adapted to pass nitrous oxide therethrough; and
   wherein the third outlet end comprises third outlet castellations.

5. The nozzle of claim 4, wherein the third outlet castellatioris have a width of between about 0.050 and about 0.150 inches and a depth of between about 0.010 and about 0.060 inches.

6. The nozzle of claim 4, wherein the third outlet castellations have a width of about 0.094 inches and a depth of about 0.030 inches.

7. A nozzle for providing nitrous oxide to an internal combustion engine, the nozzle comprising:
   a central fuel injector passage terminating at a first outlet end for passing fuel from a fuel injector therethrough;
   an inner annular passage arranged circumferentially around the central fuel injector passage, and terminating at a second outlet end; and
   an outer annular passage arranged circumferentially around the inner annular passage, and terminating at a third outlet end;
   wherein one or both of the inner and outer annular passages is adapted to pass nitrous oxide therethrough; and
   wherein the second outlet end comprises second outlet castellations and the third outlet end comprises third outlet castellations,
   the second outlet castellations and third outlet castellations being indexed relative to one another.

8. A nozzle for providing nitrous oxide to an internal combustion engine, the nozzle comprising:
   a central fuel injector passage terminating at a first outlet end for passing fuel from a fuel injector therethrough;
   an inner annular passage arranged circumferentially around the central fuel injector passage, and terminating at a second outlet end; and
   an outer annular passage arranged circumferentially around the inner annular passage, and terminating at a third outlet end;
   wherein one or both of the inner and outer annular passages is adapted to pass nitrous oxide therethrough; and
   wherein the second outlet end comprises second outlet fingers extending from the second outlet end to an exterior wall of the central fuel injector passage.

9. A nozzle for providing nitrous oxide to an internal combustion engine, the nozzle comprising:
   a central fuel injector passage terminating at a first outlet end for passing fuel from a fuel injector therethrough;
   an inner annular passage arranged circumferentially around the central fuel injector passage, and terminating at a second outlet end; and an outer annular passage arranged circumferentially around the inner annular passage, and terminating at a third outlet end;

wherein one or both of the inner and outer annular passages is adapted to pass nitrous oxide therethrough; and wherein the third outlet end comprises third outlet fingers extending from the third outlet end to an exterior wall of the inner annular passage.

10. A nozzle for providing nitrous oxide to an internal combustion engine, the nozzle comprising:

a central fuel injector passage terminating at a first outlet end for passing fuel from a fuel injector therethrough;

an inner annular passage arranged circumferentially around the central fuel injector passage and terminating at a second outlet end, the second outlet end comprising a first set of castellations and fingers that extend from the second outlet end and terminating adjacent an outer wall of the central fuel injector passage; and an outer annular passage arranged circumferentially around the inner annular passage, and terminating at a third outlet end, the third outlet end comprising a second set of castellations and fingers that extend from the third outlet end and terminating adjacent an outer wall of the central fuel injector passage.

11. The nozzle of claim 10, wherein one or both of the inner and outer annular passages is adapted to pass nitrous oxide therethrough.

12. The nozzle of claim 12, wherein the nozzle is adapted to fit between a fuel injector and an engine without substantial modification to the engine.

13. The nozzle of claim 10, wherein at least one of the first set of castellations and the second set of castellations is adapted to encourage tumble flow in fuel and nitrous oxide exiting the nozzle.

14. The nozzle of claim 10, wherein at least one of the first set of castellations and the second set of castellations is substantially perpendicular with the cylindrical axis of the nozzle.

15. The nozzle of claim 10, wherein at least one of the first set of castellations and the second set of castellations is adapted to encourage swirl flow in fuel and nitrous oxide exiting the nozzle.

16. The nozzle of claim 10, wherein at least one of the first set of castellations and the second set of castellations is angled with respect to the cylindrical axis of the nozzle.

17. The nozzle of claim 10, wherein at least one of the first set of castellations and the second set of castellations is adapted to reduce fuel choke-off.

18. The nozzle of claim 10, wherein the first set of castellations and the second set of castellations are indexed relative to one another.

19. A method for providing fluids to an internal combustion engine comprising:

providing a central fuel injection passage terminating at a first outlet end;

providing fuel from a fuel injector to an engine through the central fuel injection passage;

providing an inner annular passage, the inner annular passage being arranged circumferentially around the central fuel injector passage, and terminating at a second outlet end;

providing additional fuel or nitrous oxide to the engine through the inner annual passage;

providing an outer annular passage, the outer annual passage being arranged circumferentially around the inner annular passage and terminating at a third outlet end; and providing additional fuel or nitrous oxide to the engine through the outer annual passage; and wherein the step of providing additional fuel or nitrous oxide to the engine through the inner annual passage further comprises passing the additional fuel or nitrous oxide through a first set of castellations at the second outlet end.

20. A method for providing fluids to an internal combustion engine comprising:

providing a central fuel injection passage terminating at a first outlet end;

providing fuel from a fuel injector to an engine through the central fuel injection passage;

providing an inner annular passage, the inner annular passage being arranged circumferentially around the central fuel injector passage, and terminating at a second outlet end;

providing additional fuel or nitrous oxide to the engine through the inner annual passage;

providing an outer annular passage, the outer annual passage being arranged circumferentially around the inner annular passage and terminating at a third outlet end; and providing additional fuel or nitrous oxide to the engine through the outer annual passage; and wherein the step of providing additional fuel or nitrous oxide to the engine through the outer annual passage further comprises passing the additional fuel or nitrous oxide through a second set of castellations at the third outlet end.

* * * * *